United States Patent [19]
Mehra

[11] Patent Number: 5,561,988
[45] Date of Patent: Oct. 8, 1996

[54] RETROFIT UNIT FOR UPGRADING NATURAL GAS REFRIGERAITION PLANTS

[75] Inventor: Yuy R. Mehra, The Woodlands, Tex.

[73] Assignee: Advanced Extraction Technologies, Inc., Houston, Tex.

[21] Appl. No.: 549,276

[22] Filed: Oct. 27, 1995

[51] Int. Cl.$^6$ ........................................................ F25J 3/00
[52] U.S. Cl. .................................. 62/625; 62/632; 62/635; 62/938
[58] Field of Search ............................ 62/625, 632, 635, 62/938

[56] References Cited

U.S. PATENT DOCUMENTS

| | | |
|---|---|---|
| 2,335,162 | 11/1943 | Shiras . |
| 2,337,254 | 12/1943 | Legatski et al. . |
| 2,377,736 | 6/1945 | White . |
| 2,428,521 | 10/1947 | Latchum, Jr. . |
| 2,497,421 | 2/1950 | Shiras . |
| 2,516,507 | 7/1950 | Deming . |
| 2,666,019 | 1/1954 | Winn et al. . |
| 2,782,141 | 2/1957 | King . |
| 2,849,371 | 8/1958 | Gilmore . |
| 2,857,018 | 10/1958 | Partridge et al. . |
| 2,959,540 | 11/1960 | Cahn et al. . |
| 3,214,890 | 11/1965 | Sterrett . |
| 4,072,604 | 2/1978 | Ward . |
| 4,608,068 | 8/1986 | Bauer et al. . |
| 4,617,038 | 10/1986 | Mehra . |
| 4,692,179 | 9/1987 | Mehra . |
| 4,696,688 | 9/1987 | Mehra . |
| 4,705,549 | 11/1987 | Sapper . |
| 4,713,940 | 12/1987 | Ranke et al. . |
| 4,883,515 | 11/1989 | Mehra et al. . |

OTHER PUBLICATIONS

"Processing Hydrocarbon Gases with the Mehra Process$^{SM}$ Technology," *Chemical Engineering* (McGraw-Hill Publication).
Mehra, "Mehra Process$^{SM}$ Flexibility Improves Gas Processing Margins," 66th Annual GPA Convention, Denver, Colorado (Mar. 16–18, 1987).
Mehra, "Natural Gas Processing and Hydrocarbon Separation, Mehra Process," *Encyclopedia of Chemical Processing and Design*.
Mehra, "New Process Flexibility Improves Gas Processing Margins," Advanced Extraction Technologies, Inc. (reprinted from *Energy Progress*, Sep. 1987).

*Primary Examiner*—Ronald C. Capossela
*Attorney, Agent, or Firm*—Arnold, White & Durkee

[57] ABSTRACT

A retrofitted unit to an existing simple refrigerated natural gas plant that substantially increases the amounts of propane, butanes and natural gasoline, or ethane, propane, butanes and natural gasoline recovered from the natural gas in the existing gas treatment plant, wherein in one embodiment the existing natural gas treatment plant includes a refrigerated feed cooler, a separator and a stabilizer and the retrofitted unit comprises an NGL absorber, a refrigerated lean solvent cooler and a lean solvent regenerator; and wherein in a second embodiment the existing simple refrigerated gas treatment plant additionally includes an NGL fractionation train that separates the recovered NGL into saleable fractions and wherein the NGL fractionation train includes a debutanizer that produces all or part of the lean solvent utilized in the retrofitted unit which comprises an NGL absorber and a refrigerated solvent cooler.

34 Claims, 8 Drawing Sheets

RETROFIT UNIT FOR UPGRADING NATURAL GAS REFRIGERAITION PLANTS

FIELD OF THE INVENTION

This invention relates to natural gas treatment plants that recover propane, butanes and natural gasoline components from natural gas. These products are generally referred to as natural gas liquids (NGL).

BACKGROUND OF THE INVENTION

The predominant component of natural gas is methane. However, natural gas as produced also typically contains ethane, propane, butanes and natural gasoline ($C_5+$) components.

While the composition of natural gases vary significantly, the composition of a typical sweet dry natural gas stream for illustration is presented in TABLE 1:

TABLE 1

Typical Sweet Dry Natural Gas Stream

| Component | Composition, Mol % |
| --- | --- |
| Nitrogen ($N_2$) | 0.41 |
| Methane ($C_1$) | 83.13 |
| Carbon Dioxide ($CO_2$) | 0.50 |
| Ethane ($C_2$) | 7.28 |
| Propane ($C_3$) | 5.58 |
| Iso-Butane (i-$C_4$) | 1.00 |
| Normal-Butane (n-$C_4$) | 1.72 |
| Pentanes Plus ($C_5+$) | 0.38 |
| Total | 100.00 |

The natural gas stream is typically further processed in a plant located near the production site to recover propane, butanes and natural gasoline components because (1) these heavier components are usually worth more as chemical plant feedstock than their equivalent fuel value in natural gas, and (2) to meet pipeline specifications to prevent plugging of the natural gas pipeline due to the condensation of heavier components at lower temperatures prevalent in buried pipes.

A commonly used system to treat natural gas is generally referred to as the simple refrigeration process. Of the approximately 1,000 natural gas treatment plants believed to be operating presently in the U.S., about 250 use the simple refrigeration process. In a simple refrigeration process plant, the compressed natural gas stream at a pressure of from about 350 psig to about 1,200 psig is cooled in several cooling stages to a temperature of between about 0° F. and −50° F. The final cooling stage is generally a refrigerated feed cooler in which the natural gas stream is cooled by a suitable refrigerant such as atmospheric vaporizing liquid propane. Other suitable refrigerants such as freon or propylene may also be utilized to achieve the required cooling of the natural gas.

As the natural gas stream is cooled, part of the ethane, propane, butanes and most of the heavier hydrocarbons are condensed. In plants located away from NGL pipeline, the condensed liquids are separated from the natural gas stream in a separator and stabilized by stripping off methane and ethane to achieve Reid Vapor Pressure of the liquid product of 250 psig maximum at 100° F. for sale via tank truck or railroad tanker. Thus, the remotely located plants generally produce a product made up of propane, butanes and $C_5+$ mix. The operation of the stabilizer column in these remote plants is in a deethanizer mode in which ethane and lighter components are removed overhead and a $C_3+$ product is produced.

For plants that are in close proximity to an NGL pipeline, the liquid product slate from the simple refrigeration process plant may additionally include the ethane component. Accordingly, the operation of the stabilizer column is in a demethanizer mode where methane is removed overhead because a $C_2+$ product is produced.

Regardless of the composition of the NGL product slate, the uncondensed gases leaving the overhead of the separator are transported to market via pipeline and must meet the hydrocarbon dew point specification of the natural gas pipeline.

While the simple refrigeration-based natural gas treating plants are relatively inexpensive and simple to build and operate, they are not cost effective because they typically recover only about 15% to 30% of the ethane, only about 30% to 60% of the propane and 50% to 80% of the butanes present in the natural gas feed stream. Therefore, about 70% to 85% of the ethane, 40% to 70% of the propane and 20% to 50% of the butanes in the natural gas stream remains in the natural gas providing only the heating value credits back to the natural gas producer. Most of the time, the price of propane and butanes is significantly higher than their heating value in fuel gas. So the natural gas producers would prefer to increase recovery of propane and butanes from the natural gas feed stream by continuing to use their simple refrigeration gas treating plants. Accordingly, the low recovery of propane or propane and butane in simple refrigeration plants significantly reduces the producer's profit margin.

Sometimes the price of ethane is higher than its heating value in natural gas. At times when the price of ethane is greater than its heating value in fuel gas and if the plants are accessible to an NGL pipeline, the producers would prefer to increase recovery of ethane as well.

For the foregoing reasons, there is a need for a flexible and cost effective unit that can be conveniently retrofitted on to an existing simple refrigeration natural gas treating unit that will increase recovery of propane and butanes, and at times ethane, propane and butanes from natural gas.

SUMMARY OF THE INVENTION

The present invention is directed to a process unit that can be retrofitted to an existing simple refrigerated natural gas treatment plant to increase recovery of propane, butanes and natural gasoline components and optionally ethane from natural gas. Simple refrigerated natural gas treatment plants typically include a train of cooler heat exchangers, that cools the incoming natural gas stream (compressed to from about 350 psig to about 1,200 psig), a separator and a stabilizer. The last cooler heat exchanger in the train is typically a refrigerated feed cooler heat exchanger which uses a refrigerant to reduce the exit temperature of the natural gas stream to from about 0° F. to −50° F., preferably from about −15° F. to about −35° F., and most preferably from −20° F. to −30° F. These temperature ranges are selected by balancing the need to minimize capital investment through simpler metallurgy like carbon steel instead of stainless steel and to maximize recovery of natural gas liquids. As the natural gas stream is cooled, natural gas liquids (NGL) condense. NGL includes propane, butanes and natural gasoline components ($C_5+$ alkanes).

The condensed NGL that is separated from the natural gas stream contains methane and ethane which increase its volatility and which can preclude shipment by common carriers. The NGL is fractionated in a stabilizer to reduce the methane or methane and ethane content of the NGL. The stabilizer can be operated as a deethanizer wherein both ethane and methane are distilled overhead out of the NGL or as a deethanizer wherein methane alone is distilled overhead out of the NGL. The stabilizer overhead gas stream is combined with the natural gas produced by the plant for sale to a natural gas pipeline and the stabilizer bottoms stream is NGL.

Depending upon the operating mode of the stabilizer, the stabilizer bottoms stream can be sold as NGL comprising mixed $C_2+$ alkanes or mixed $C_3+$ alkanes. Some gas treatment plants include a train of fractionation distillation towers that separate the NGL into two or more of its component fractions by conventional and well known distillation procedures. The distillation train may include a depropanizer tower that produces a propane and a butanes product stream and usually does include a debutanizer tower that produces a $C_5+$ bottoms stream that is the lean absorption solvent used in the NGL absorber of the retrofitable unit of this invention.

Accordingly, there are two preferred embodiments of the retrofitable unit of the present invention: (1) For natural gas plants that do not have an NGL fractionation train, the retrofitted unit includes an NGL absorber, a solvent regenerator to produce lean solvent and a refrigerated solvent cooler; and (2) For natural gas plants that have an NGL fractionation train that includes a debutanizer that produces a $C_5+$ bottoms stream that is employed as the lean oil absorption solvent, the retrofitted unit includes an NGL absorber and a solvent cooler; a solvent regenerator is not required. A third embodiment of the present invention is envisioned wherein the retrofitted unit includes a solvent regenerator to produce additional lean solvent even though the existing natural gas plant includes a debutanizer if the existing debutanizer is undersized.

In the NGL absorber, the uncondensed gas stream from the separator is contacted with lean solvent that has been cooled to a temperature from about 0° F. to −50° F., preferably from about −10° F. to −40° F., more preferably from about −15° F. to −35° F., and most preferably from −20° F. to −30° F., to produce an overhead natural gas stream that meets natural gas pipeline heating value and heavy liquids specifications and is therefore suitable for sale to a pipeline. These temperature ranges are carefully selected by considering the cost of equipment metallurgy and the need to minimize solvent losses.

The NGL absorber bottoms stream, comprised of lean solvent plus NGL absorbed by the lean solvent in the absorber, is conveyed to the solvent regenerator which produces a solvent regenerator bottoms stream comprised of $C_5+$ components from the natural gas feed stream. The solvent regenerator bottoms stream is pumped back to the NGL absorber as the lean solvent. It should be noted that lean solvent is internally generated in the process from NGL components in the natural gas feed stream; no external solvent is needed.

The NGL absorber may or may not have a bottoms reboiler that provides stripping gas that is injected into the bottom of the NGL absorber. When a reboiler is provided, the bottom section of the NGL absorber is operated as a stripping section. If ethane in the natural gas feed stream is to be sold in the NGL product stream and ethane is to remain in the NGL, the stabilizer in the existing gas treatment plant is operated as demethanizer. The stripping section of the NGL absorber is operated to reduce the methane content of the NGL absorber bottoms stream sufficiently so that the NGL stream produced overhead from the solvent regenerator can be sold without further processing to reduce its methane content. If ethane in the natural gas feed stream is to be included in the natural gas product stream and not in the NGL, then the stabilizer in the existing gas treatment plant is operated as a deethanizer and the NGL absorber stripping section is operated to reduce the ethane concentration in the absorber bottoms stream so that the overhead stream produced by the solvent regenerator contains little ethane.

It is possible that the operating pressure in the reboiler of the NGL absorber can approach the critical pressure of the system, thereby inducing unstable operation. In this case, it is preferable to use a dual pressure NGL absorber wherein the absorption section operates at higher pressure than the stripping section and vapor from the stripping section is compressed into the absorption section using a compressor.

The stabilizer can comprise an overhead condenser which produces reflux which is pumped back into the top of the tower. With reflux, the stabilizer overhead gas stream can meet natural gas pipeline specifications without further processing.

If the stabilizer does not have an overhead condenser, the stabilizer overhead gas stream contains NGL. The stabilizer overhead stream can optionally be conveyed to the NGL absorber to recover its contained NGL. If pressure in the stabilizer is less than pressure in the NGL absorber, the stabilizer overhead gas stream has to be compressed with a compressor.

In a preferred option that is applicable to both embodiments of the invention, the lean solvent stream from the solvent regenerator is presaturated with methane by contacting it with all or part of the NGL absorber overhead gas stream upstream of the solvent cooler. This presaturates the lean solvent stream with methane and ethane. The advantage of presaturation is that the heat of absorption released when methane and ethane dissolve in the solvent is released in the NGL absorber overhead system rather than in the NGL absorber and is removed by the solvent cooler rather than raising temperature in the NGL absorber, thereby improving NGL absorption efficiency.

The retrofitted unit of this invention when properly integrated into an existing simple refrigerated natural gas treatment plant increases the amounts of propane, butanes and optionally ethane that are recovered from the feed natural gas stream at a cost that is competitive with the added value of NGL products over their fuel value in natural gas. Moreover, the retrofitted unit flexibly adapts to variations in the rate and composition of the natural gas feed stream and can readily be shifted to either recover ethane in the natural gas stream or in an NGL product stream.

A fuller understanding of these and other features, aspects and advantages of the present invention can be obtained from the following description, appended claims, and accompanying drawings.

Figure 1:
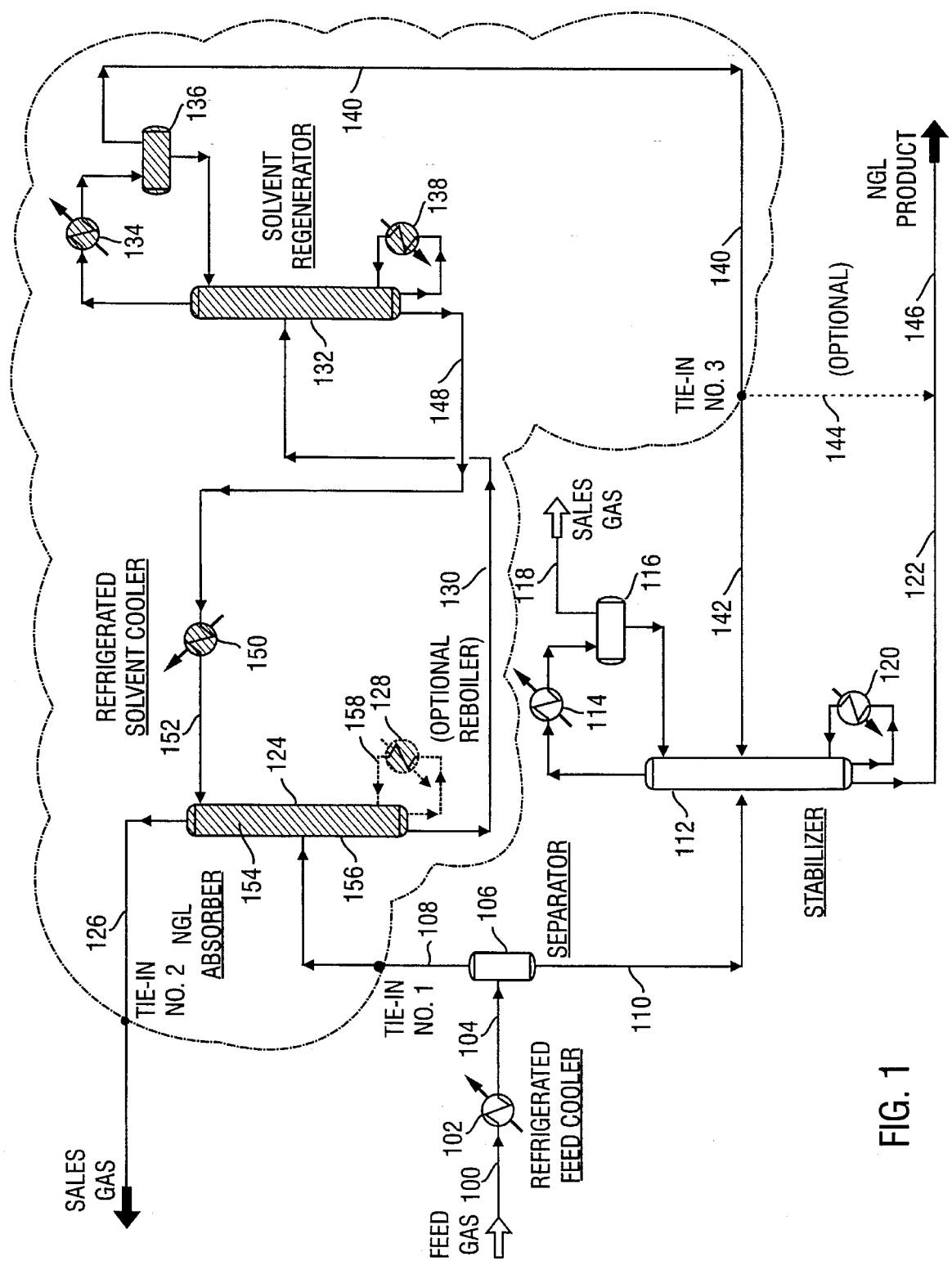
FIG. 1 is a simplified process flow diagram showing how the present invention is applied to a simplified refrigerated natural gas treatment plant that does not have an NGL fractionation train, and that has a stabilizer with an overhead refluxed condenser.

In the interest of clarity, pumps, heat exchangers, control valves, control systems, and auxiliary equipment items that are necessary for the practical and safe operation of the unit but that are not necessary to explain the invention have intentionally been left out of the figures. These deletions do not limit the scope of the invention.

DETAILED DESCRIPTION OF THE PREFERRED EMBODIMENTS

Natural gas typically contains nitrogen, hydrogen sulfide and other sulfide compounds, carbon dioxide and water. Prior to processing natural gas to recover NGL, the gas stream is usually treated in a gas sweetening unit to remove sulfides, carbon dioxide and dried to remove water using conventional and well known processes to produce a "sweet dry" natural gas stream. In most simple refrigeration plants, ethylene glycol is injected in the natural gas stream prior to cooling of the gas. In such units, the gas and ethylene glycol are simultaneously cooled in the exchangers. The ethylene glycol water mixture is removed in a three phase separator, which also serves as the NGL separator from the uncondensed gases. Even though this step is not shown in the FIGS. 1 through 8, it should be understood that these steps are incorporated when natural gas feed is not dehydrated prior to cooling with other available processes.

Preferably, the natural gas feed stream going to a simple refrigeration plant for recovering NGL must be dried to a dew point below about −50° F. to avoid forming hydrates at the low temperatures encountered in the refrigeration plant. Sulfide and carbon dioxide removal is optional since they do not interfere with NGL recovery. Moreover, the product streams from simple refrigerated natural gas treatment plants can be treated to remove sulfides and carbon dioxide.

The natural gas feed to a simple refrigeration plant is compressed to a pressure of from about 350 psig to about 1,200 psig because typically natural gas pipelines operate in this pressure range. The compressor (not shown) used is typically a gas engine driver multi-stage reciprocating compressor with interstage cooling and liquid separation. The feed gas compression can be on site or incorporated as part of the gathering system.

The compressed natural gas stream is cooled to a temperature of between about 0° F. to −50° F., preferably from about −10° F. to about −40° F., more preferably from about −15° F. to about −35° F., and most preferably from =20° F. to −30° F. in several cooling stages. The feed cooling train typically consists of two to three shell and tube heat exchangers in series and wherein typically cooling water or air coolers are used in the lead exchangers, and cross heat exchange integration with internal process and product streams in the intermediate coolers to improve energy utilization efficiency. However, the final cooling stage is always a refrigerated feed gas cooler in which the natural gas stream is cooled by heat exchange against a suitable refrigerant such as low pressure vaporizing liquid propane.

FIG. 1 is a simplified process flow diagram showing how the retrofitable unit of the present invention is applied and retrofitted to an existing simplified refrigerated natural gas treatment plant. The existing simplified refrigeration natural gas treatment plant is comprised of a refrigerated feed cooler 102, a separator 106 and a stabilizer 112. In this embodiment, the existing simplified natural gas treating plant does not have an NGL fractionation train, and the stabilizer has a stabilizer overhead condenser 114. This embodiment of the retrofitable unit of the present invention is comprised of an NGL absorber 124, a solvent regenerator 132 and a refrigerated solvent cooler 150. The retrofitable unit of the present invention is contained within the envelope shown on the drawing. Tie-ins to the existing simple refrigerated gas treating plant are also indicated on the drawing. The natural gas feed stream 100 is cooled to between 0° F. and −50° F., preferably from about −10° F. to about −40° F., more preferably from about −15° F. to about −35° F., and most preferably from =20° F. to −30° F., in the refrigerated feed cooler 102 and the cooled stream 104 is conveyed to the separator 106. The separator 106 removes NGL that has condensed out of the natural gas stream as it was cooled. The NGL condensate leaves the separator 106 as the separator bottoms stream 110. The separator bottoms stream 110 is conveyed to the stabilizer 112. In an existing simple refrigeration gas treating plant, the separator overhead gas stream 108 is conveyed to the feed residue gas cross exchangers and leaves the treating plant for the sales gas pipeline. However, as shown via Tie-in No. 1, the overhead gas stream 108 is conveyed to the NGL absorber 124.

The NGL absorber 124 includes an absorption section 154 and can optionally include a stripping section 156 with a bottoms reboiler 128 that produces a stripping gas 158 that is injected into the bottom of the stripping section 156. For an NGL absorber 124 with a stripping section 156 the separator overhead gas stream 108 is fed into the side of the tower between the bottom of the absorption section 154 and the top of the stripping section 156 and flows up the tower. A lean solvent stream 152 that has been cooled to from about 0° F. to −50° F., preferably from about −10° F. to about −40°

F., more preferably from about −15° F. to about −35° F., and most preferably from −20° F. to −30° F., in the refrigerated solvent cooler 150 is fed into the top of absorption section 154 of the NGL absorber 124 and flows down the tower countercurrently contacting the feed gas stream 108. The refrigerated solvent cooler 150 is typically a shell and tube heat exchanger that is cooled with a suitable refrigerant such as vaporizing low pressure liquid propane. The NGL absorber 124 is packed with raschig rings or other commercially available mass transfer enhancing packing or contains trays such as sieve trays that induce liquid/gas mass transfer. The lean solvent absorbs NGL from the natural gas stream during the countercurrent contacting between the two streams to produce an NGL absorber overhead stream 126 that is suitable for sale to a natural gas pipeline. Before leaving the retrofitted unit, stream 126 through Tie-in No. 2 is warmed by heat exchange with process streams such as feed coolers.

The solvent stream flows from the absorption section down into the top of the stripping section 156. In the stripping section, the falling solvent stream is contacted countercurrently with rising stripping gas produced by the reboiler 128 which strips residual methane or methane and ethane out of the solvent.

The NGL absorber bottoms stream 130, which is comprised of lean solvent and the NGL that was absorbed by the lean solvent from the separator overhead stream 108 in the NGL absorber 124, is conveyed to the solvent regenerator 132. The solvent regenerator 132 is a conventional distillation tower, filled with packing or with distillation trays, that fractionates the NGL absorber bottoms stream 130 into a solvent regenerator overhead stream 140 and a liquid solvent regenerator bottoms stream 148 that is comprised of $C_5+$ alkanes from the natural gas feed stream 100. The solvent regenerator bottoms stream 148 is conveyed through the refrigerated solvent cooler 150 to the NGL absorber 124 as the lean solvent stream 152. Note that the lean solvent consists essentially of NGL components from the natural gas feed stream 100; an external lean solvent is not required by the process of this invention. The solvent regenerator 132 is equipped with a reflux condenser 134 and a reflux accumulator 136 to maintain an inventory of the lean solvent. The solvent regenerator column is reboiled by reboiler 138. The solvent regenerator overhead stream 140 can optionally be a total vapor, partially vapor or totally liquid stream.

When the NGL absorber 124 is not provided with the optional reboiler 128, the solvent regenerator overhead stream 140, comprised of NGL plus methane and ethane, is conveyed to the stabilizer 112. The separator bottoms stream 110 is also conveyed to the stabilizer 112. The stabilizer 112 is a conventional distillation tower that comprises a reboiled stripping section and a rectification section with stabilizer overhead condenser that produces reflux which is injected into the top of the rectification section of the stabilizer. The stabilizer reflux condenser can be a partial condenser as shown in FIG. 1 or a total condenser. A condensate inventory is maintained for reflux in accumulator 116. The stabilizer 112 fractionates the separator bottoms stream 110 and the solvent regenerator overhead stream 142 to produce the stabilizer overhead stream 118 which is suitable for a natural gas pipeline, and the stabilizer bottoms stream 122 which is the NGL product stream. The stabilizer is reboiled with reboiler 120. The stabilizer overhead stream 118 can be combined with stream 126 through Tie-in No. 2 for further heat exchange to reduce energy consumption via thermal integration.

NGL absorber 124 with a stripping section 156 can strip the NGL absorber bottoms stream sufficiently free of methane or methane and ethane, depending upon whether ethane is to be recovered in NGL or natural gas, so that the solvent regenerator overhead stream 140 can be conveyed directly into the stabilizer bottoms stream via line 144 through indicated Tie-in No. 3 as part of the NGL product 146 rather than to the stabilizer 112. However, with NGL absorbers without a stripping section the solvent regenerator overhead stream must be conveyed to the stabilizer 112.

Figure 2:
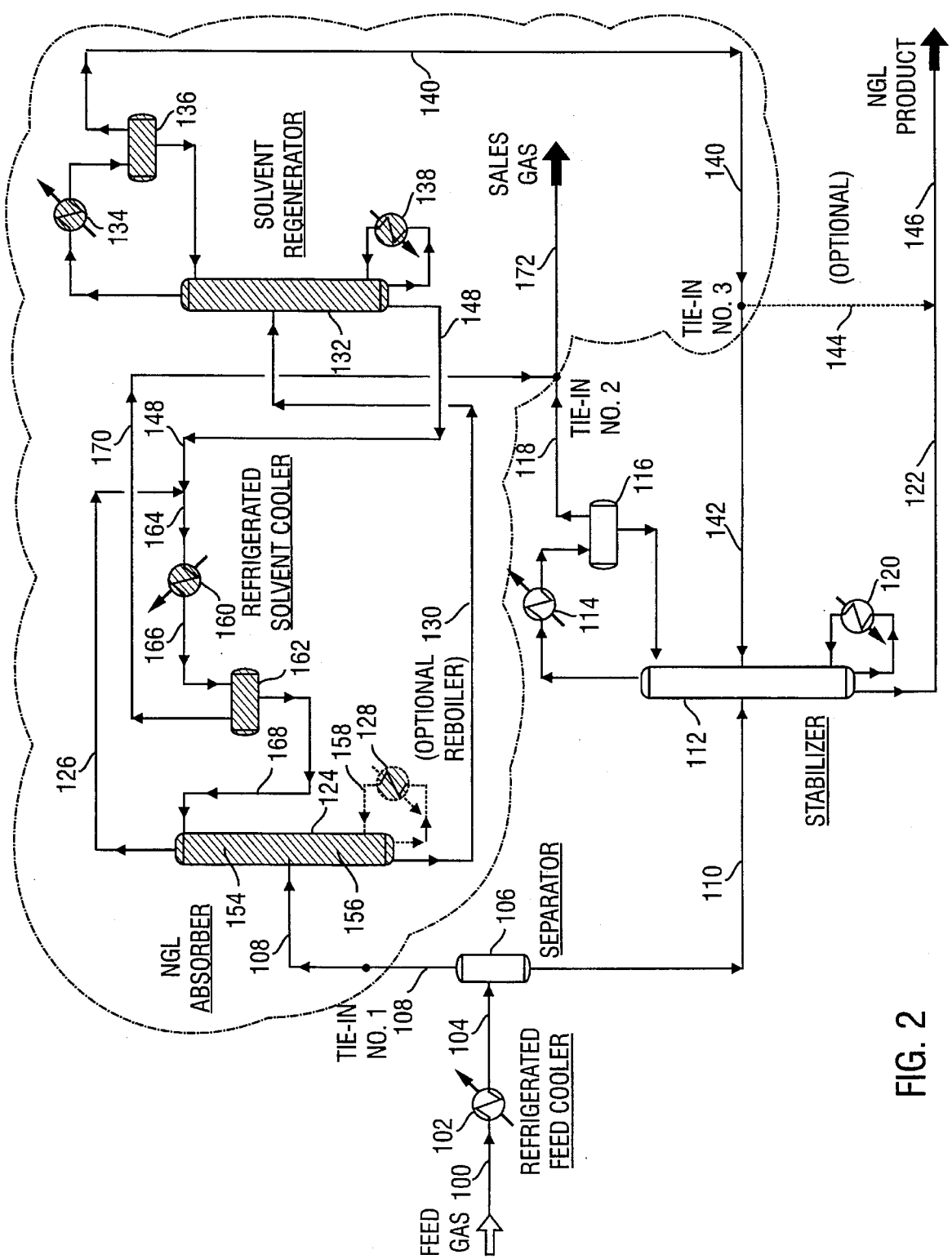
FIG. 2 is a simplified process flow diagram showing how the present invention is applied to a simplified refrigerated natural gas treatment plant that does not have an NGL fractionation train, that has a stabilizer with an overhead refluxed condenser, and includes presaturation of the lean solvent stream.

FIG. 2 includes facilities for presaturating the lean solvent stream with methane and ethane before the stream is cooled and fed into the top of the NGL absorber. The NGL absorber 124 comprises a solvent presaturator chiller 160 and a presaturator separator drum 162. All or part of the NGL absorber overhead stream 126 is contacted with the solvent regenerator bottom stream 148 upstream of the solvent presaturator chiller 160. Provision is made for the two streams to effectively contact the two streams. The mixed stream 164 is conveyed through the refrigerated presaturator chiller 160 as stream 166 to the presaturator separator drum 162 and then to the top of the NGL absorber 124 as stream 168. The overhead stream 170 from the presaturator separator drum 162 is suitable for the natural gas pipeline and is conveniently mixed with stream 118 from the stabilizer 112 to form sales gas stream 172 after exchanging its refrigerant value with process streams within the retrofitted units.

Figure 3:
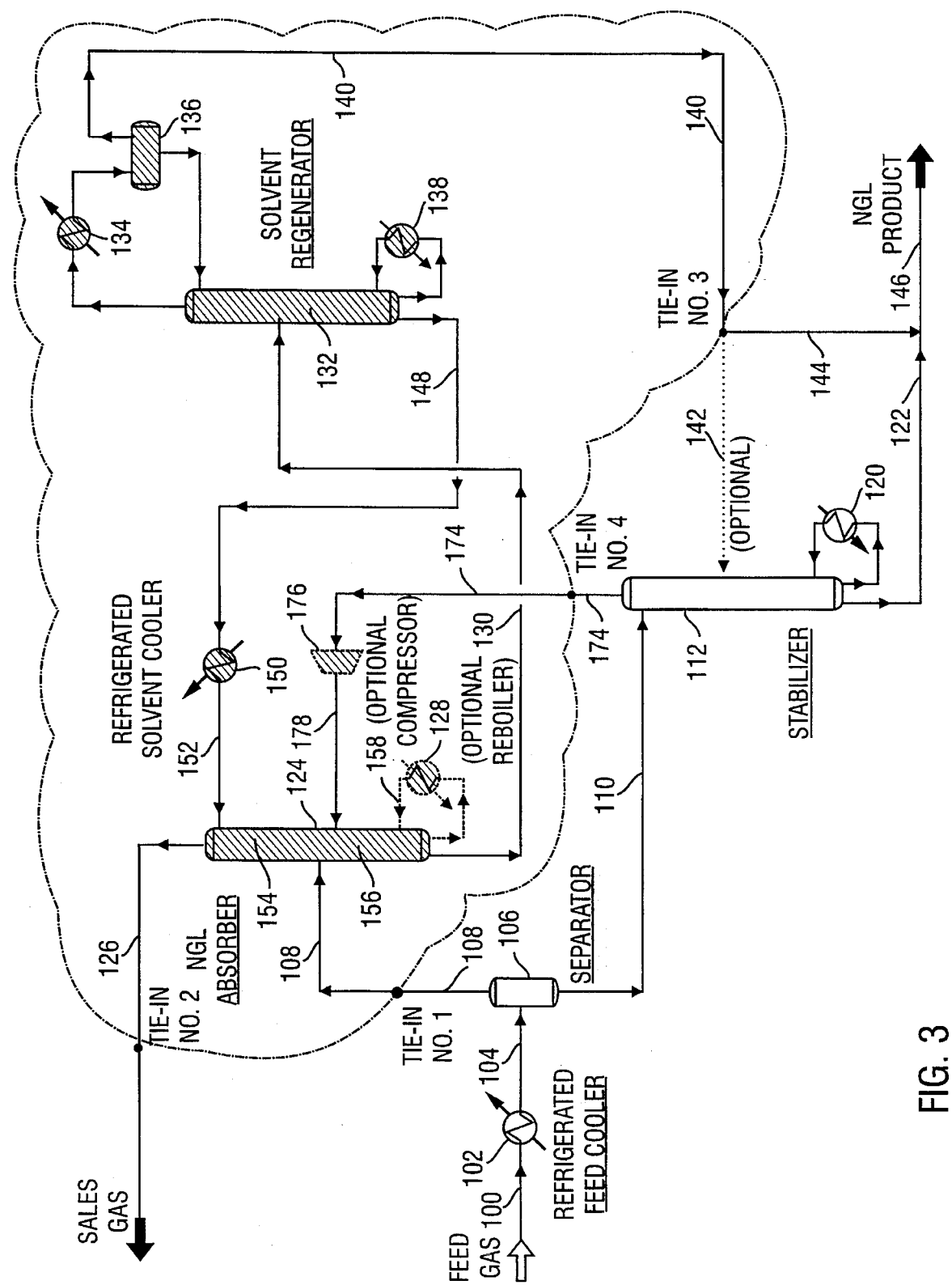
FIG. 3 is a simplified process flow diagram showing how the present invention is applied to a simplified refrigerated natural gas treatment plant that does not have an NGL fractionation train, and that has a stabilizer without an overhead refluxed condenser.

FIG. 3 shows how the retrofitable unit of the present invention is retrofitted to an existing simplified refrigerated natural gas plant which includes a stabilizer that does not have an overhead reflux condenser 114. In this embodiment, the stabilizer overhead gas stream 174 is conveyed to the bottom of the NGL absorber section 154. A compressor 176 may be required to pump stream 174 into NGL absorber 124 as stream 178 if pressure in the stabilizer 112 is less than pressure in the NGL absorber 124. If the NGL absorber 124 has a stripping section 156, then the solvent regenerator overhead stream 140 can directly join the stabilizer bottoms stream 122 through Tie-in No. 3 via line 144 as NGL product 146; if the NGL absorber 124 has no stripping section, then the solvent regenerator overhead stream 140 must be conveyed through line 142 to the stabilizer 112. In this embodiment, all of the sales gas leaves from the overhead of the NGL absorber as stream 126 through Tie-in No. 2 for heat exchange with the process streams.

Figure 4:
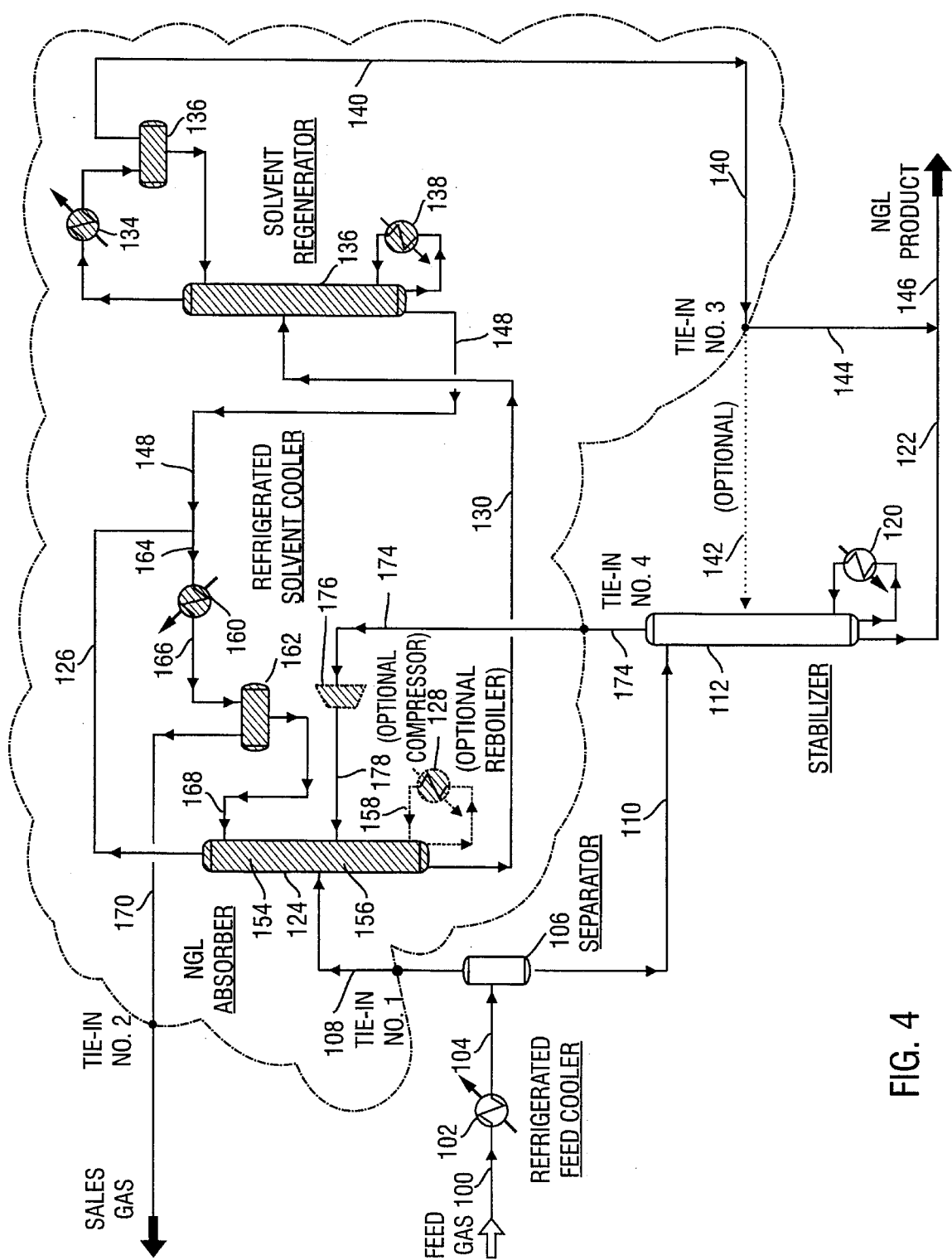
FIG. 4 is a simplified process flow diagram showing how the present invention is applied to a simplified refrigerated natural gas treatment plant that does not have an NGL fractionation, that has a stabilizer without an overhead refluxed condenser, and includes presaturation of the lean solvent stream.

FIG. 4 includes the lean solvent presaturation system discussed in conjunction with FIG. 2 with the process of FIG. 3. The entire sales gas in this embodiment comes from the overhead of the presaturator separator drum 162 as stream 170, which exchanges heat with the process streams within the retrofitted unit.

Since in most existing simple refrigeration natural gas treating plants streams 108 and 174 am combined and exchange heat with process streams such as the feed gas stream 100, Tie-in Nos. 1 and 4 of embodiments of this invention in FIGS. 3 and 4 may be conveniently combined into a single Tie-in and fed into the NGL absorber 124 as stream 108 thereby not requiring the optional compressor 176 and its associated stream 178.

Figure 5:
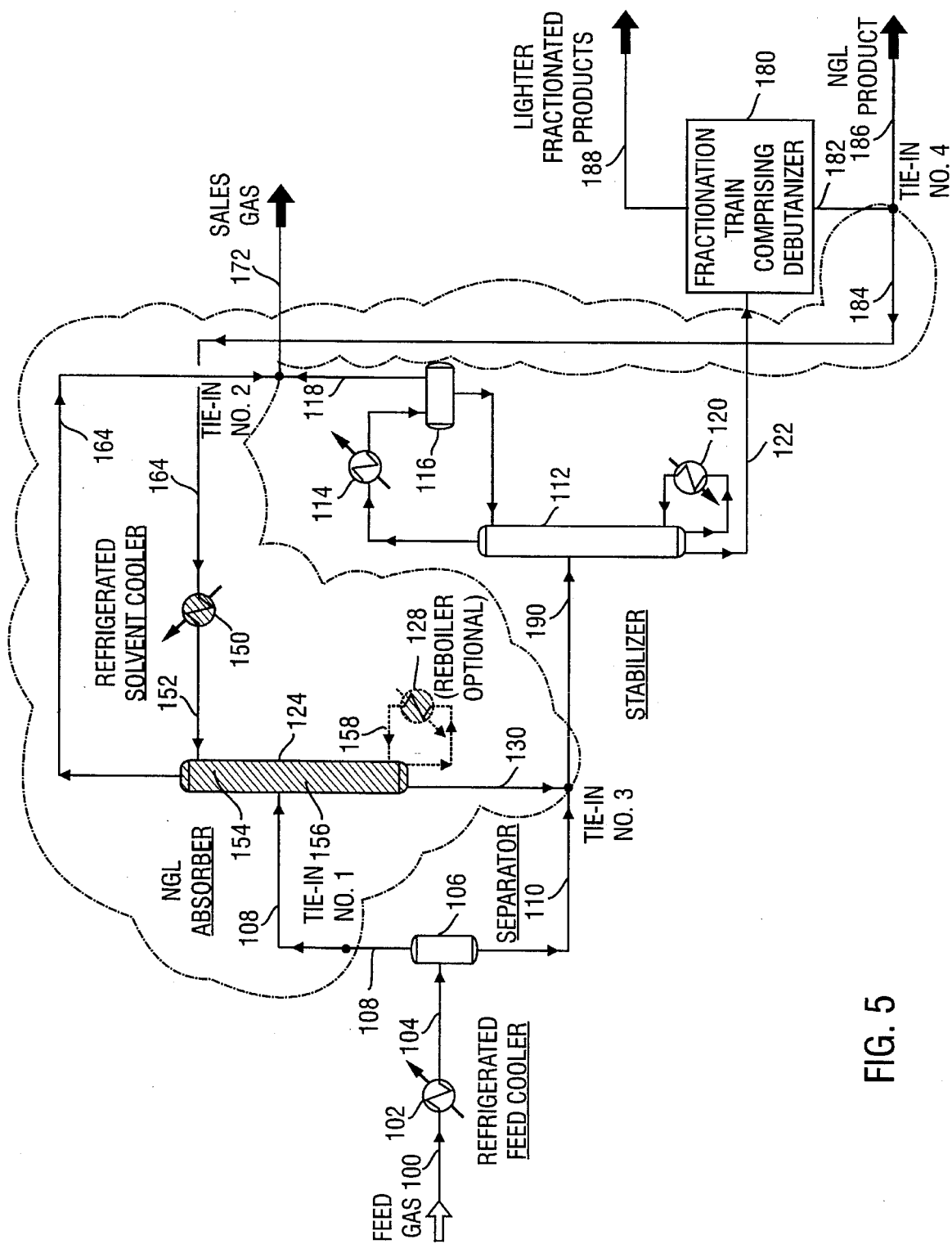
FIG. 5 is a simplified process flow diagram showing how the present invention is applied to a simplified refrigerated natural gas treatment plant that has an NGL fractionation train, and a stabilizer with an overhead refluxed condenser.

FIG. 5 is a simplified process flow diagram showing how the retrofitable unit of the present invention is applied and retrofitted to an existing simplified refrigerated natural gas treatment plant comprised of a refrigerated feed cooler 102, a separator 106 and a stabilizer 112. In this embodiment, the existing simplified natural gas treating plant does have an NGL fractionation train comprising a debutanizer, and the stabilizer has a stabilizer overhead condenser 114. This embodiment of the retrofitable unit of the present invention is comprised of an NGL absorber 124 and a refrigerated solvent cooler 150. The retrofitable unit of the present invention is contained within the envelope shown on the drawing. Tie-ins to the existing simple refrigerated gas treating plant are also indicated on the drawing. The natural gas feed stream 100 is cooled to between 0° F. and −50° F., preferably from about −10° F. to about −40° F., more preferably from about −15° F. to about −35° F., and most preferably from −20° F. to −30° F., in the refrigerated feed cooler 102 and the cooled stream 104 is conveyed to the separator 106. The separator 106 removes NGL that has condensed out of the natural gas stream as it was cooled. The NGL condensate leaves the separator 106 as the separator bottoms stream 110. The separator bottoms stream 110 is conveyed to the stabilizer 112. In an existing simple refrigeration gas treating plant, the separator overhead gas stream 108 is conveyed to the feed residue gas cross exchangers and leaves the treating plant for the sales gas pipeline. However, as shown via Tie-in No. 1, the overhead gas stream 108 is conveyed to the NGL absorber 124.

The NGL absorber 124 includes an absorption section 154 and can optionally include a stripping section 156 with a bottoms reboiler 128 that produces a stripping gas 158 that is injected into the bottom of the stripping section 156. For an NGL absorber 124 with a stripping section 156 the separator overhead gas stream 108 is fed into the side of the tower between the bottom of the absorption section 154 and the top of the stripping section 156 and flows up the tower. A lean solvent stream 152 that has been cooled to from about 0° F. to −50° F., preferably from about −10° F. to about −40° F., more preferably from about −15° F. to about −35° F., and most preferably from =20° F. to −30° F., in the refrigerated solvent cooler 150 is fed into the top of absorption section 154 of the NGL absorber 124 and flows down the tower countercurrently contacting the feed gas stream 108. The refrigerated solvent cooler 150 is typically a shell and tube heat exchanger that is cooled with a suitable refrigerant such as vaporizing low pressure liquid propane. The NGL absorber 124 is packed with raschig rings or other commercially available mass transfer enhancing packing or contains trays such as sieve trays that induce liquid/gas mass transfer. The lean solvent absorbs NGL from the natural gas stream during the countercurrent contacting between the two streams to produce an NGL absorber overhead stream 126 that is suitable for sale to a natural gas pipeline.

The solvent stream flows from the absorption section down into the top of the stripping section 156. In the stripping section, the falling solvent stream is contacted countercurrently with rising stripping gas produced by the reboiler 128 which strips residual methane or methane and ethane out of the solvent.

The NGL absorber bottoms stream 130, which is comprised of lean solvent and the NGL that was absorbed by the lean solvent from the separator overhead stream 108 in the NGL absorber 124, is conveyed to stabilizer 112.

Another feature not shown relates to the optional reboiler 128 when provided for the NGL absorber 124; the NGL absorber bottoms stream 130 may directly flow to the fractionation train comprising a debutanizer 180.

The stabilizer 112 is a conventional distillation tower that comprises a reboiled stripping section and a rectification section with an overhead condenser that produces reflux which is injected into the top of the rectification section of the stabilizer. The stabilizer overhead condenser 114 generates reflux which is separated in accumulator 116 for returning to the top of the stabilizer 112. The stabilizer 112 fractionates the separator bottoms stream 110 and the absorber bottoms stream 130 via Tie-in No. 3 to form stream 190 to produce the stabilizer overhead stream 118 which is suitable for a natural gas pipeline, and the stabilizer bottoms stream 122, comprised of NGL components, that is conveyed to the fractionation train 180 comprising a debutanizer. The stabilizer is reboiled with reboiler 120. The overhead stream 118 can be combined with absorber overhead stream 126 through Tie-in No. 2 to form stream 172 for further heat exchange with process streams prior to entering the sales gas pipeline.

The NGL absorber 124 with a stripping section 156 can strip the NGL absorber bottoms stream sufficiently free of methane or methane and ethane, depending on whether ethane is sold in the natural gas or in the NGL product, so as to reduce their content into the feed stream 190 that is fractionated by the stabilizer 112 to reduce the stripping duty imposed on the stabilizer 112.

The stabilizer bottoms stream 122, comprised of NGL components is separated into several product fractions by the existing fractionation train 180 which comprises at least a debutanizer column that produces a $C_5+$ NGL bottoms stream 182. A part of this $C_5+$ NGL debutanizer bottoms stream 184 is pumped through the refrigerated solvent cooler 150 to the NGL absorber 124 as the lean solvent. Note that the lean solvent consists essentially of NGL components from the natural gas feed stream 100; an external lean solvent is not required by the process of this invention. The remainder of the debutanizer bottoms stream 186 is sold as a $C_5+$ NGL product. Depending upon the configuration of towers in the NGL fractionation train 180, the lighter NGL products 188 may be comprised of ethane, ethane/propane mix, propane, mixed burnes, or iso-butane and n-butane products.

Figure 6:
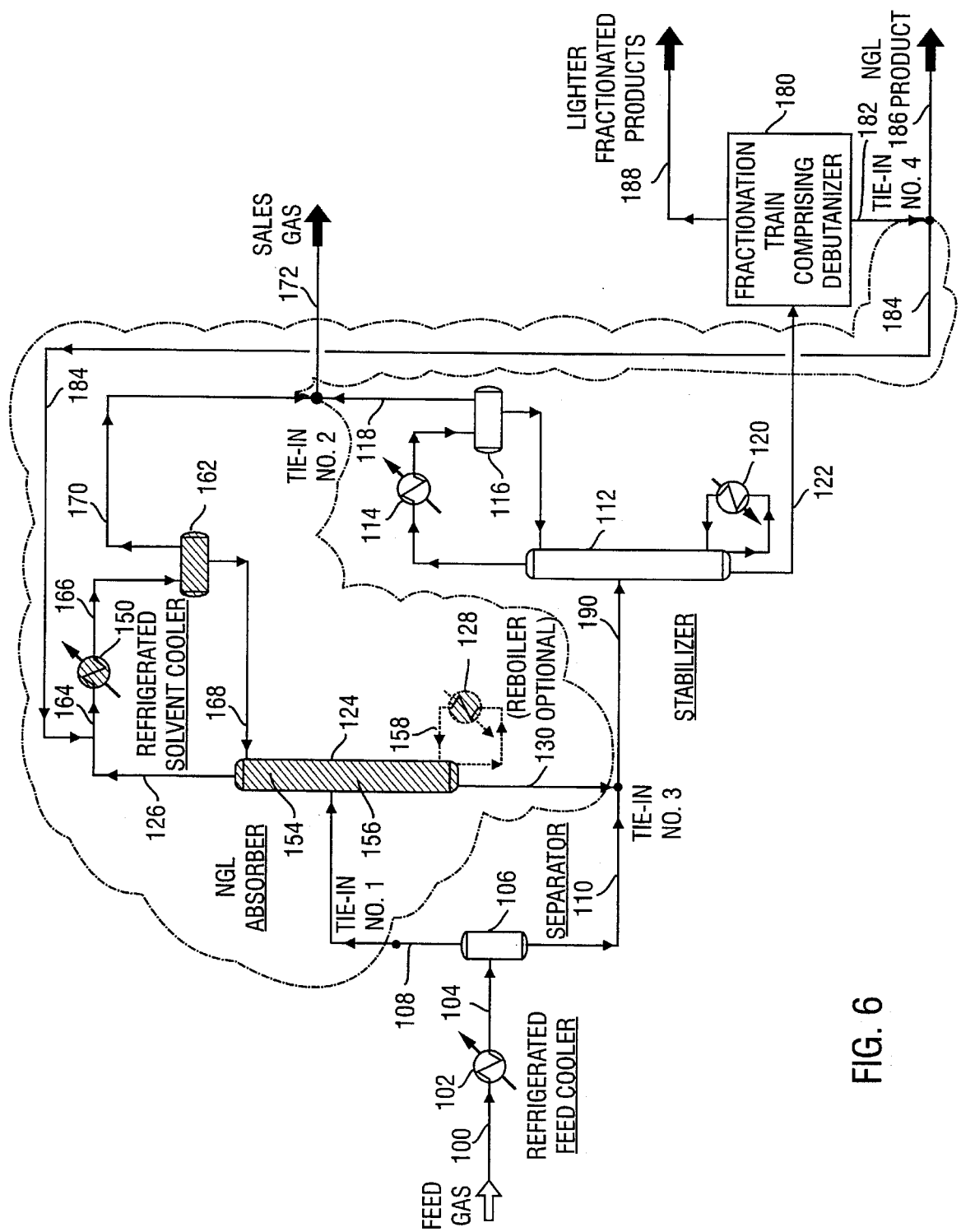
FIG. 6 is a simplified process flow diagram showing how the present invention is applied to a simplified refrigerated natural gas treatment plant that has an NGL fractionation train, a stabilizer with an overhead refluxed condenser, and includes presaturation of the lean solvent stream.

FIG. 6 includes facilities for presaturating the lean solvent stream with methane and ethane before the stream is cooled and fed into the top of the NGL absorber. The NGL absorber 124 comprises a solvent presaturator chiller 160 and a presaturator separator drum 162. All or part of the NGL absorber overhead stream 126 is contacted with the bottoms stream 184 from the fractionation train comprising debutanizer 180 upstream of the solvent presaturator chiller 160. Provision is made to effectively contact the two streams. The mixed stream 164 is conveyed through the refrigerated presaturator chiller 160 as stream 166 to the presaturator separator drum 162 and then to the top of the NGL absorber 124 as stream 168. The overhead stream 170 from the presaturator separator drum 162 is suitable for the natural gas pipeline and is conveniently mixed with stream 118 from the stabilizer 112 to form sales gas stream 172 after exchanging its refrigerant value by cross heat exchange with process streams within the retrofitted units.

Figure 7:
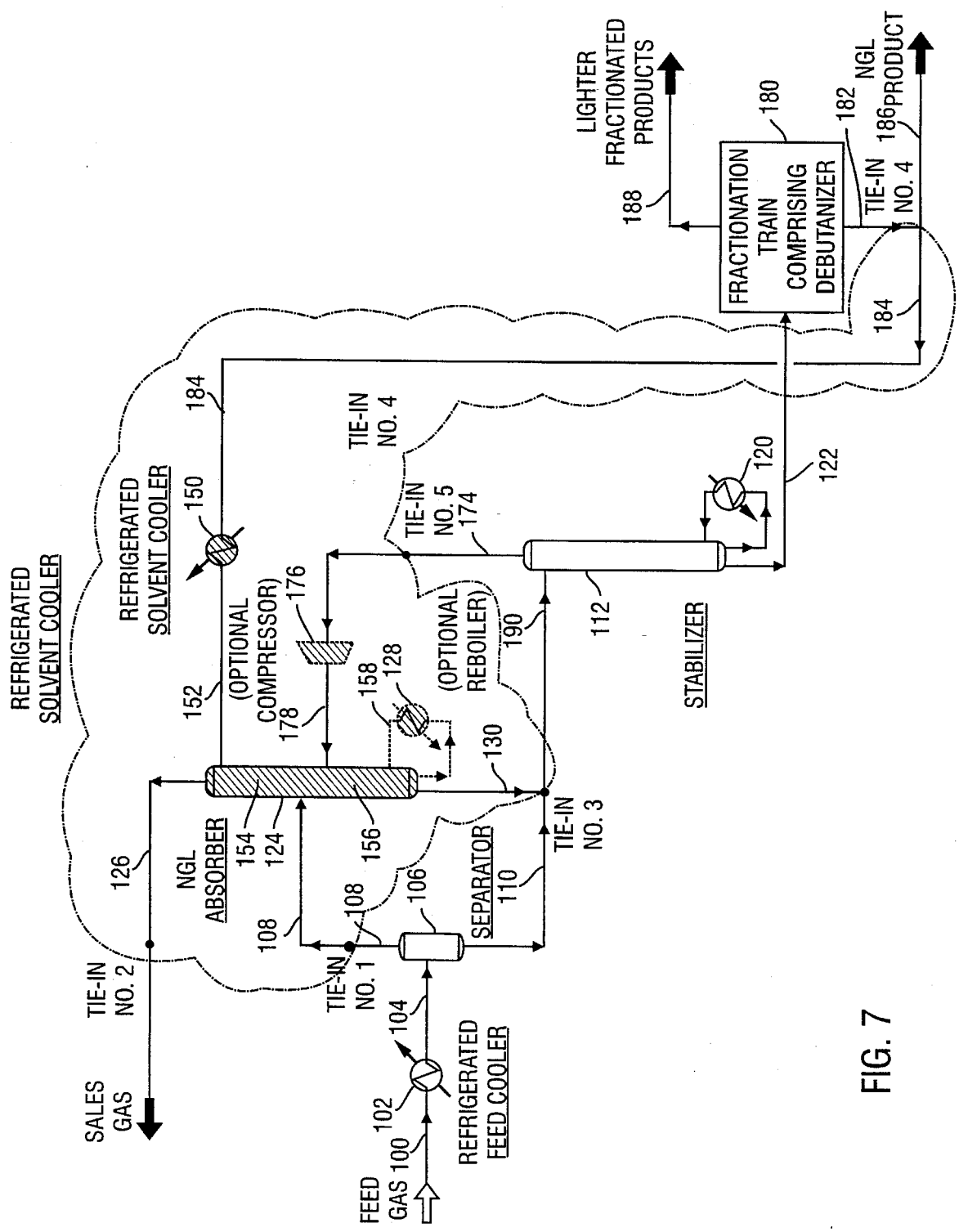
FIG. 7 is a simplified process flow diagram showing how the present invention is applied to a simplified refrigerated natural gas treatment plant that has an NGL fractionation train, and a stabilizer without an overhead refluxed condenser.

FIG. 7 shows how the retrofitable unit of the present invention is retrofitted to an existing simplified refrigerated natural gas plant which includes a stabilizer that does not have an overhead reflux condenser 114. In this embodiment, the stabilizer overhead gas stream 174 is conveyed to the bottom of the NGL absorber section 154. A compressor is required to pump the stabilizer overhead gas stream into the NGL absorber if the pressure in the stabilizer 112 is less than the pressure in the NGL absorber 124. The bottoms stream 130 from the NGL absorber 124 is combined with separator bottoms stream 110 through Tie-in No. 3 to feed via line 190 into the stabilizer 112. In this embodiment, all of the sales gas leaves from the overhead of the NGL absorber as stream 126 through Tie-in No. 2 for heat exchange with the process streams.

Figure 8:
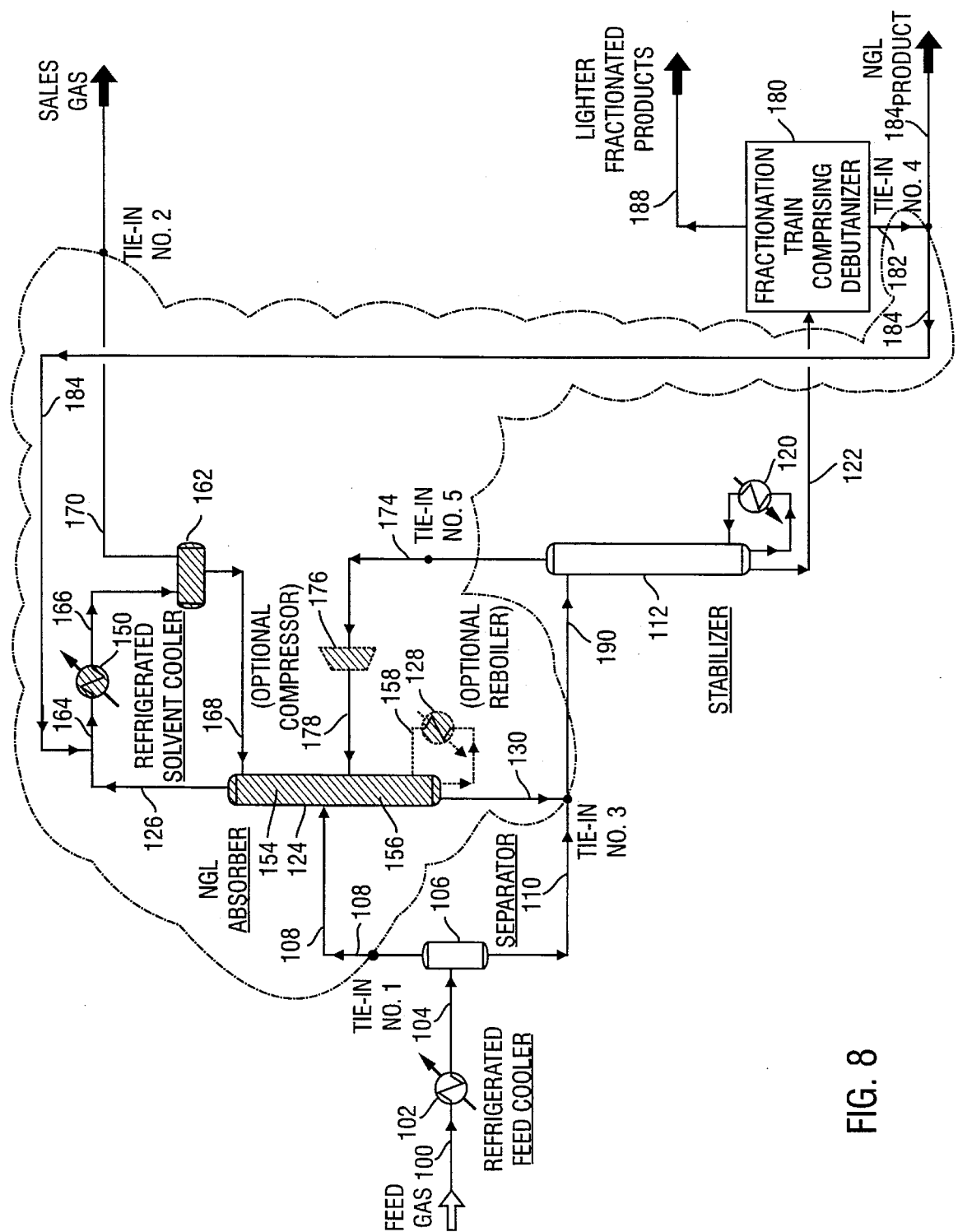
FIG. 8 is a simplified process flow diagram showing how the present invention is applied to a simplified refrigerated natural gas treatment plant that has an NGL fractionation train, a stabilizer without an overhead refluxed condenser, and includes presaturation of the lean solvent stream.

FIG. 8 includes the lean solvent presaturation system discussed in conjunction with FIG. 6 with the process of FIG. 7. The entire sales gas in this embodiment comes from the overhead of the presaturator separator drum 162 as stream 170, which exchanges heat with the process streams within the retrofitted unit.

Since in most existing simple refrigeration natural gas treating plants streams 108 and 174 are combined and exchange heat with process streams such as the feed gas stream 100, Tie-in Nos. 1 and 5 of embodiments of this invention in FIGS. 7 and 8 may be conveniently combined into a single Tie-in and fed into the NGL absorber 124 as stream 108 thereby not requiring the optional compressor 176 and its associated stream 178.

When the NGL absorber 124 is equipped with the optional reboiler 128 in embodiments of FIGS. 5 through 8, the bottoms stream 130 may be optionally sent directly to the existing fractionation train comprising debutanizer 180, thereby relocating the Tie-in No. 3 from joining streams 110 and 130 to joining streams 130 and 122. If so, then the combined stream 190 feeds into the fractionation train 180 instead of stream 122 as described above.

As previously discussed, if the existing simplified refrigerated natural gas treatment plant includes an NGL fractionation train with a debutanizer, then the retrofitable unit of the present invention may not require a solvent regeneratoro The debutanizer bottoms stream is comprised of $C_5+$ alkanes from the natural gas feed stream which serves as the lean solvent to the NGL absorber. However, this requires that the stabilizer and the fractionation train in the existing gas treatment plant have the capacity to produce lean solvent at the rate required by the retrofitted unit of this invention. If the stabilizer and fractionation train do not have sufficient capacity to produce all the lean solvent that is required, then a solvent regenerator sized to make up the capacity shortfall is included in the retrofitted unit of this invention. In this case, referring to FIGS. 5 through 8, the NGL absorber bottoms stream 130 is diverted to the solvent regenerator and the solvent regenerator bottoms stream which is comprised of $C_5+$ alkanes from the natural gas feed replaces or adds to the debutanizer bottoms stream 184. Since most of the $C_5+$ components in the natural gas feed stream are recovered in the stabilizer bottoms stream 122, some of the debutanizer bottoms stream 182 may be used as lean solvent via stream 184. A flow sheet for the embodiment wherein the retrofitted unit of this invention includes a solvent regenerator even though the existing gas treatment plant includes a debutanizer is not provided. However, to briefly summarize this embodiment, the NGL absorber liquid bottoms stream is conveyed to the solvent regenerator to produce a solvent regenerator overhead stream comprising propane, butanes and natural gasoline components of the feed natural gas stream and a solvent regenerator bottoms stream comprising natural gasoline components. The solvent regenerator overhead stream is conveyed either to the stabilizer or to the fractionation train of distillation towers comprising a debutanizer. In the retrofitted unit, the solvent regenerator bottoms stream is conveyed along with part of the debutanizer bottoms stream through the refrigerated solvent cooler to the NGL absorber as the lean solvent stream.

In all the embodiments, the stabilizer 112 can be operated either as a demethanizer or a deethanizer by changing the bottoms temperature. If the value of ethane in NGL is more than its heating value in fuel gas, then operators prefer to recover ethane from the natural gas feed in the NGL product stream, provided of course the existing refrigeration plant has access to an NGL pipeline. The stabilizer is thus operated as a demethanizer forcing most of the ethane in the stabilizer feed down into the stabilizer bottoms stream 122. Accordingly, the NGL absorber 124 if equipped with reboiler 128 operates as a demethanizing absorber, thereby retaining absorbed ethane in the NGL absorber bottoms stream 130. Thus, the NGL absorber bottoms stream 130 contains incremental ethane, propane and butanes previously unrecovered from stream 108.

If the value of ethane in NGL is less than its heating value in fuel gas or the existing simple refrigeration plant does not have access to an NGL pipeline and is limited to the choice of transportation through tank trucks or railroad tankers, then operators prefer to leave ethane in the sales gas stream. In this case, stabilizer 112 is operated in the deethanizer mode by increasing the bottoms temperature with reboiler 120 so that most of the ethane in the stabilizer feed streams is forced up into the stabilizer overhead stream. Similarly, when the NGL absorber 124 is equipped with an optional reboiler 128, the NGL absorber 124 is operated as a deethanizing absorber. The stripping gas in stream 158 rejects most of the absorbed methane and ethane from the NGL absorber bottoms stream 130 and retains most of the incremental propane and butanes previously unrecovered through streams 108.

In all of the embodiments of the process of this invention, the refrigeration requirements within the retrofitable unit are provided by the existing refrigeration circuit for the existing simple refrigeration natural gas treatment plant. People skilled in the art of designing natural gas treating plants shall recognize that the foregoing is a preference but not a requirement. Therefore, it should be understood that to the extent possible within the capabilities of the existing refrigeration circuit, balanced by the need to maximize NGL product recoveries, may require supplementing the existing refrigeration circuit by the installation of additional refrigeration compression and condensing capacity.

The present invention therefore is a unit that is retrofitable to an existing simple refrigerated natural gas treatment plant that significantly increases the amounts of propane, butanes and optionally ethane that are recovered from natural gas feed stream. Since producers receive higher prices for natural gas liquids than for natural gas, increasing recovery of NGL from natural gas increases producer's profit.

The preferred configuration of the retrofitable unit of this invention varies depending on whether or not the existing natural gas plant includes a debutanizer and whether or not the existing stabilizer includes an overhead condenser. Although preferred versions of the present invention have been described for these contingencies in considerable detail, other versions are possible. Therefore, the spirit and scope of the appended claims should not be limited to the description of the preferred versions described herein.

EXAMPLE 1

Example 1 compares the recovery of propane and butanes from a typical natural gas stream in a simple refrigerated natural gas plant before and after the retrofitable unit of the present invention is installed. The example refers to the embodiment of the invention of FIG. 2 which depicts a natural gas treatment plant that does not have an NGL fractionation train.

TABLE 2 summarizes the results of a material balance for the process of FIG. 2 before the retrofitable unit of the present invention is installed. The stream numbers in TABLE 2 refer to FIG. 2. The stream data are from a heat and material balance computed using a commercial process simulation computer program widely used to design process plants. A natural gas feed stream 100 at 415 psig and 120° F. is fed into the gas treatment plant at a rate of 31.22 MMscfd (3,428.27 Lbmoles/hr.). The feed stream is cooled to −20° F. against −25° F. vaporizing propane refrigerant in the refrigerated feed cooler 102. The existing natural gas plant without the retrofitable unit of the present invention recovers only 30.27% of the propanes, 58.17% of the i-butane, and 67.93% of the n-butane from the feed natural gas stream into the NGL product stream.

TABLE 2

Current Operation of Existing Simple Refrigeration Plant
Stream Material Balance (Lbmoles/hr)

| | Stream 100 | Stream 108 | Stream 118 | Stream 122 | NGL Recovery |
|---|---|---|---|---|---|
| $N_2$ | 6.18 | 6.16 | 0.02 | 0.00 | |
| $CO_2$ | 423.94 | 403.72 | 20.22 | 0.00 | |
| $C_1$ | 2599.97 | 2560.35 | 39.62 | 0.00 | |
| $C_2$ | 196.17 | 175.93 | 19.48 | 0.76 | |
| $C_3$ | 111.65 | 74.54 | 3.31 | 33.80 | 30.27% |
| $i-C_4$ | 18.55 | 7.76 | 0.00 | 10.79 | 58.17% |
| $n-C_4$ | 42.60 | 13.66 | 0.00 | 28.94 | 67.93% |
| $C_5+$ | 35.93 | 3.23 | 0.00 | 32.16 | |
| Total | 3428.27 | 3245.35 | 82.65 | 100.27 | |

TABLE 3 summarizes the heat and material balance for the natural gas treatment plant after the retrofitable unit of this invention is installed as shown in FIG. 2. The lean solvent stream 148 at a flow rate of 380 Lbmoles/hr. at a temperature of −20° F., enters the absorber 124 at the top. All other conditions are the same conditions as for the material balance of TABLE 2 for the case before the retrofitable unit of the present invention was installed.

TABLE 3

Upgraded Operation of the Retrofitted Simple Refrigeration
Unit Stream Material Balance (Lbmoles/hr)

| | Stream 100 | Stream 170 | Stream 118 | Stream 122 | NGL Recovery |
|---|---|---|---|---|---|
| $N_2$ | 6.18 | 6.16 | 0.02 | 0.00 | |
| $CO_2$ | 423.94 | 360.58 | 63.36 | 0.00 | |
| $C_1$ | 2599.97 | 2546.17 | 53.80 | 0.00 | |
| $C_2$ | 196.17 | 122.53 | 71.80 | 1.84 | |
| $C_3$ | 111.65 | 2.69 | 1.35 | 107.61 | 96.38% |
| $i-C_4$ | 18.55 | 0.29 | 0.00 | 18.26 | 98.44% |
| $n-C_4$ | 42.60 | 1.11 | 0.00 | 41.49 | 97.39% |
| $C_5$% | 35.39 | 3.16 | 0.00 | 32.23 | |
| Total | 3428.27 | 3039.53 | 190.33 | 201.43 | |

After installation of the retrofitable unit of the present invention, the recovery of propane, i-butane and n-butane from the natural gas feed stream to the NGL product stream increase to 94.99%, 99.96%, and 99.45% respectively, nearly total recovery.

EXAMPLE 2

Example 2 compares the recovery of propane and butanes from a typical natural gas stream in a simple refrigerated natural gas plant before and after the retrofitable unit of the present invention is installed. The example refers to the embodiment of the invention of FIG. 6 which depicts a natural gas treating plant that has an NGL fractionation train including a debutanizer.

TABLE 4 summarizes the results of a material balance for the process of FIG. 6 before the retrofitable unit of the present invention is installed. The stream numbers in TABLE 4 refer to FIG. 6. The stream data are from a heat and material balance computed using a commercial process simulation computer program widely used to design process plants. A natural gas feed stream 100 at 640 psig and 110° F. is fed into the gas treatment plant at a rate of 24.0 MMscfd (2,635.12 moles/hr.). The feed stream is cooled to −30° F. against −35° F. vaporizing propane refrigerant in the refrigerated feed cooler 102. The stabilizer 112 is operated as a deethanizer. The existing natural gas plant without the retrofitable unit of the present invention recovers only 57.27% of the propanes, 78.25% of the i-butane, and 84.00% of the n-butane from the feed natural gas stream into the NGL.

TABLE 4

Current Operation of Existing Simple Refrigeration Plant
Stream Material Balance (Lbmoles/hr)

| | Stream 100 | Stream 108 | Stream 118 | Stream 122 | NGL Recovery |
|---|---|---|---|---|---|
| $N_2$ | 10.80 | 10.60 | 0.20 | 0.00 | |
| $CO_2$ | 0.00 | 0.00 | 0.00 | 0.00 | |
| $C_1$ | 2203.76 | 2072.30 | 131.46 | 0.00 | |
| $C_2$ | 191.84 | 138.27 | 51.30 | 2.27 | |
| $C_3$ | 147.04 | 60.13 | 2.70 | 84.21 | 57.27% |
| $i-C_4$ | 26.35 | 5.73 | 0.00 | 20.62 | 78.25% |
| $n-C_4$ | 45.32 | 7.25 | 0.00 | 38.07 | 84.00% |
| $C_5+$ | 10.01 | 0.66 | 0.00 | 9.35 | |
| Total | 2635.12 | 2294.94 | 185.66 | 154.52 | |

TABLE 5 summarizes the heat and material balance for the natural gas treatment plant after the retrofitable unit of this invention is installed as shown in FIG. 6. The lean solvent flow rate in stream 184 is 140 lbmoles/hr. It is from the bottoms stream of the debutanizer in the NGL fractionation train and is comprised of $C_5+$ alkanes from the natural gas feed stream. The lean solvent stream 168 entering the NGL absorber 124 is cooled to −20° F. in the refrigerated solvent cooler 160.

TABLE 5

Upgraded Operation of the Retrofitted Simple Refrigeration
Unit Stream Material Balance (Lbmoles/hr)

| | Stream 100 | Stream 170 | Stream 118 | Stream 122 | NGL Recovery |
|---|---|---|---|---|---|
| $N_2$ | 10.80 | 10.42 | 0.38 | 0.00 | |
| $CO_2$ | 0.00 | 0.00 | 0.00 | 0.00 | |
| $C_1$ | 2203.76 | 1947.01 | 256.75 | 0.00 | |
| $C_2$ | 191.84 | 87.39 | 100.70 | 3.75 | |
| $C_3$ | 147.04 | 2.16 | 5.20 | 139.68 | 94.99% |
| $i-C_4$ | 26.35 | 0.01 | 0.00 | 26.37 | 99.96% |
| $n-C_4$ | 45.32 | 0.25 | 0.0050 | 46.41 | 99.45% |
| $C_5+$ | 10.01 | 4.95 | 0.0050 | 143.69 | |
| Total | 2635.12 | 2052.19 | 363.03 | 359.90 | |

After installation of the retrofitable unit of the present invention the recovery of propane, i-butane and n-butane from the natural gas feed stream to the NGL product stream increase to 96.38%, 98.44% and 97.39% respectively, nearly total recovery.

Various modifications can be made to the retrofitted unit, especially in the choice of equipment and non-critical processing steps. While the invention has been described by specific examples and figures, there is no intent to limit the inventive concept as set forth in the following claims.

What is claimed is:

1. A retrofitted unit operatively connected to an existing simple refrigerated natural gas plant wherein the existing simple refrigerated natural gas plant recovers natural gas liquids comprising propane, butanes and natural gasoline from a natural gas feed stream, and wherein the existing simple refrigerated natural gas plant is comprised of a feed cooler, a separator and a stabilizer, said retrofitted unit comprising:

a) a feed cooler for cooling the natural gas feed stream to from about 0° F. to about −50° F.;

b) a separator operatively connected to receive the cooled natural gas stream said separator for producing a separator overhead gas stream and a separator liquid bottoms stream;

c) an NGL absorber operatively connected to receive the separator overhead gas stream for contacting with a cooled lean solvent stream to produce an NGL absorber overhead gas stream that is suitable for a natural gas pipeline, and an NGL absorber liquid bottoms stream comprised of lean solvent, propane, butanes and natural gasoline components;

d) a solvent regenerator for fractionating the NGL absorber liquid bottoms stream into a solvent regenerator overhead stream, and a solvent regenerator liquid bottoms stream comprising natural gasoline components;

e) a stabilizer for fractionating the separator bottoms stream into a stabilizer overhead gas stream which is suitable for a natural gas pipeline and a stabilizer liquid bottoms stream that is comprised of propane, butanes and natural gasoline; and f) a solvent cooler for cooling the lean solvent stream to from about 0° F. to about −50° F., said solvent cooler operatively connected to receive the solvent regenerator liquid bottoms stream as the lean solvent stream and to convey the cooled lean solvent stream to the NGL absorber.

2. The retrofitted unit of claim 1 wherein the NGL absorber comprises a column segment adapted so that the separator overhead gas stream enters a point near bottom of the column segment and flows upward and the lean cooled solvent enters the column segment near its top and flows downward such that there is countercurrent contact between the two streams.

3. The retrofitted unit of claim 1 wherein the stabilizer is additionally operatively connected to receive the solvent regenerator overhead stream for fractionating into a stabilizer overhead gas stream and a stabilizer liquid bottoms stream.

4. The retrofitted unit of claim 1 wherein the NGL absorber is operatively connected to receive the stabilizer overhead gas stream.

5. The retrofitted unit of claim 1 wherein the stabilizer additionally comprises a rectification section with an overhead condenser adapted to produce reflux for injection into the top of the rectification section of the stabilizer.

6. The retrofitted unit of claim 1 wherein the stabilizer is operable as a demethanizer.

7. The retrofitted unit of claim 1 wherein the stabilizer is operable as a deethanizer.

8. The retrofitted unit of claim 1 wherein the solvent regenerator liquid bottoms stream is contacted with all or part of the overhead gas stream from the NGL absorber before the combined stream flows into the solvent cooler.

9. The retrofitted unit of claim 1 wherein the NGL absorber comprises a stripping section and a bottoms reboiler which is operative to produce a stripping gas for injection into the bottom of the NGL absorber stripping section.

10. The retrofitted unit of claim 9 wherein the NGL absorber comprises a dual pressure column with higher pressure absorption section and lower pressure stripping section.

11. A retrofitted unit operatively connected to an existing simple refrigerated natural gas plant wherein the existing simple refrigerated natural gas plant recovers natural gas liquids comprising propane, butanes and natural gasoline from a natural gas feed stream, and wherein the existing simple refrigerated natural gas plant is comprised of a feed cooler, a separator, a stabilizer, and a fractionation train of distillation towers including a debutanizer, said retrofitted unit comprising:

a) a feed cooler for cooling the natural gas feed stream to from about 0° F. to about −50° F.;

b) a separator operatively connected to receive the cooled natural gas stream said separator for producing a separator overhead gas stream and a separator liquid bottoms stream;

c) an NGL absorber operatively connected to receive the separator overhead gas stream for contacting with a cooled lean solvent stream to produce an NGL absorber overhead gas stream that is suitable for a natural gas pipeline, and an NGL absorber liquid bottoms stream comprised of lean solvent, propane, butanes and natural gasoline components;

d) a stabilizer for fractionating the separator bottoms stream into a stabilizer overhead gas stream which is suitable for a natural gas pipeline and a stabilizer liquid bottoms stream that is comprised of propane, butanes and natural gasoline;

e) a train of distillation towers that comprises a debutanizer operatively connected to receive the stabilizer liquid bottoms stream for producing a debutanizer bottoms stream comprising pentanes and heavier ($C_5+$) alkanes; and f) a solvent cooler for cooling the lean solvent stream to from about 0° F. to about −50° F., said solvent cooler operatively connected to receive a part of the debutanizer bottoms stream as the lean solvent stream and to convey the cooled lean solvent stream to the NGL absorber.

12. The retrofitted unit of claim 11 wherein the NGL absorber comprises a column segment adapted so that the separator overhead gas stream enters at a point near bottom of the column segment and flows upward and the lean cooled solvent enters the column segment near its top and flows downward such that there is countercurrent contact between the two streams.

13. The retrofitted unit of claim 11 wherein the stabilizer is additionally operatively connected to receive the NGL absorber liquid bottoms stream for fractionating into a stabilizer overhead gas stream and a stabilizer liquid bottoms stream.

14. The retrofitted unit of claim 11 wherein the NGL absorber is operatively connected to receive the stabilizer overhead gas stream.

15. The retrofitted unit of claim 11 wherein the stabilizer additionally comprises a rectification section with an overhead condenser adapted to produce reflux for injection into the top of the rectification section of the stabilizer.

16. The retrofitted unit of claim 11 wherein the stabilizer is operable as a demethanizer.

17. The retrofitted unit of claim 11 wherein the stabilizer is operable as a deethanizer.

18. The retrofitted unit of claim 11 wherein the debutanizer bottoms stream is contacted with all or part of the overhead gas stream from the NGL absorber before the combined stream flows into the solvent cooler.

19. The retrofitted unit of claim 11 wherein the NGL absorber comprises a stripping section and a bottoms reboiler which is operative to produce stripping gas for injection into the bottom of the NGL absorber stripping section.

20. The retrofitted unit of claim 19 wherein the NGL absorber comprises a dual pressure column with higher pressure absorption section and lower pressure stripping section.

21. The retrofitted unit of claim 11 wherein the fractionation train of distillation towers is operatively connected to receive the NGL absorber liquid bottoms stream.

22. The retrofitted unit of claim 11 wherein the retrofitted unit additionally comprises a solvent regenerator for fractionating the NGL absorber liquid bottoms stream to produce a solvent regenerator overhead stream comprising propane, butanes and natural gasoline components of feed gas, and a solvent regenerator liquid bottoms stream comprising the natural gasoline components.

23. The retrofitted unit of claim 22 wherein the stabilizer or the fractionation train of distillation towers is operatively connected to receive the solvent regenerator overhead stream.

24. The retrofitted unit of claim 22 wherein the solvent cooler is operatively connected to receive the solvent regenerator liquid bottoms stream and a part of the debutanizer bottoms stream.

25. A unit for retrofitting an existing simple refrigerated natural gas plant wherein the existing simple refrigerated natural gas plant recovers natural gas liquids comprising propane, butanes and natural gasoline from a natural gas feed stream, and wherein the existing simple refrigerated natural gas plant is comprised of a feed cooler, a separator and a stabilizer, said retrofitting unit comprising:

a) an NGL absorber adaptable to receive a separator overhead gas stream for contacting with a cooled lean solvent stream to produce an NGL absorber overhead gas stream, and an NGL absorber liquid bottoms stream comprising lean solvent, propane, butanes and natural gasoline components;

b) a solvent regenerator adaptable for fractionating the NGL absorber liquid bottoms stream into a solvent regenerator overhead stream, and a solvent regenerator liquid bottoms stream comprising natural gasoline components; and c) a solvent cooler adaptable for cooling the lean solvent stream to from about 0° F. to about −50° F., said solvent cooler operatively connected to receive the solvent regenerator liquid bottoms stream as the lean solvent stream and to convey the cooled lean solvent stream to the NGL absorber.

26. The retrofitting unit of claim 25 wherein the NGL absorber comprises a column segment adapted so that the separator overhead gas stream enters at a point near bottom of the column segment and flows upward and the lean cooled solvent enters the column segment near its top and flows downward such that countercurrent contact is allowable between the two streams.

27. The retrofitting unit of claim 25 wherein the NGL absorber is adaptable to receive a stabilizer overhead gas stream.

28. The retrofitting unit of claim 25 wherein the NGL absorber comprises a stripping section and a bottoms reboiler.

29. The retrofitting unit of claim 28 wherein the NGL absorber comprises a dual pressure column with higher pressure absorption section and lower pressure stripping section.

30. A unit for retrofitting an existing simple refrigerated natural gas plant wherein the existing simple refrigerated natural gas plant recovers natural gas liquids comprising propane, butanes and natural gasoline from a natural gas feed stream, and wherein the existing simple refrigerated natural gas plant is comprised of a feed cooler, a separator, a stabilizer, and a fractionation train of distillation towers including a debutanizer, said retrofitting unit comprising:

a) an NGL absorber adaptable to receive a separator overhead gas stream for contacting with a cooled lean solvent stream to produce an NGL absorber overhead gas stream that is suitable for a natural gas pipeline, and an NGL absorber liquid bottoms stream comprised of lean solvent, propane, butanes and natural gasoline components; and b) a solvent cooler adaptable for cooling the lean solvent stream to from about 0° F. to about −50° F., said solvent cooler adaptable to be connected to receive a part of a debutanizer bottoms stream as the lean solvent stream and adaptable to convey the cooled lean solvent stream to the NGL absorber.

31. The retrofitting unit of claim 30 wherein the NGL absorber comprises a column segment adapted so that the separator overhead gas stream enters at a point near bottom of the column segment and flows upward and the lean cooled solvent enters the column segment near its top and flows downward such that countercurrent contact is allowable between the two streams.

32. The retrofitting unit of claim 30 wherein the NGL absorber is adapted to receive a stabilizer overhead gas stream.

33. The retrofitting unit of claim 30 wherein the NGL absorber comprises a stripping section and a bottoms reboiler.

34. The retrofitting unit of claim 33 wherein the NGL absorber comprises a dual pressure column with higher pressure absorption section and lower pressure stripping section.

* * * * *

UNITED STATES PATENT AND TRADEMARK OFFICE
CERTIFICATE OF CORRECTION

PATENT NO. : 5,561,988
DATED : OCTOBER 8, 1996
INVENTOR(S) : YUV R. MEHRA

It is certified that error appears in the above-indentified patent and that said Letters Patent is hereby corrected as shown below:

On the title page, item [54] and column 1, line 2, change "REFRIGERAITION" to --REFRIGERATION--.

On the title page, item [75], change "Yuy" to --Yuv--.

Signed and Sealed this

Thirteenth Day of May, 1997

Attest:

BRUCE LEHMAN

Attesting Officer    Commissioner of Patents and Trademarks